UNITED STATES PATENT OFFICE.

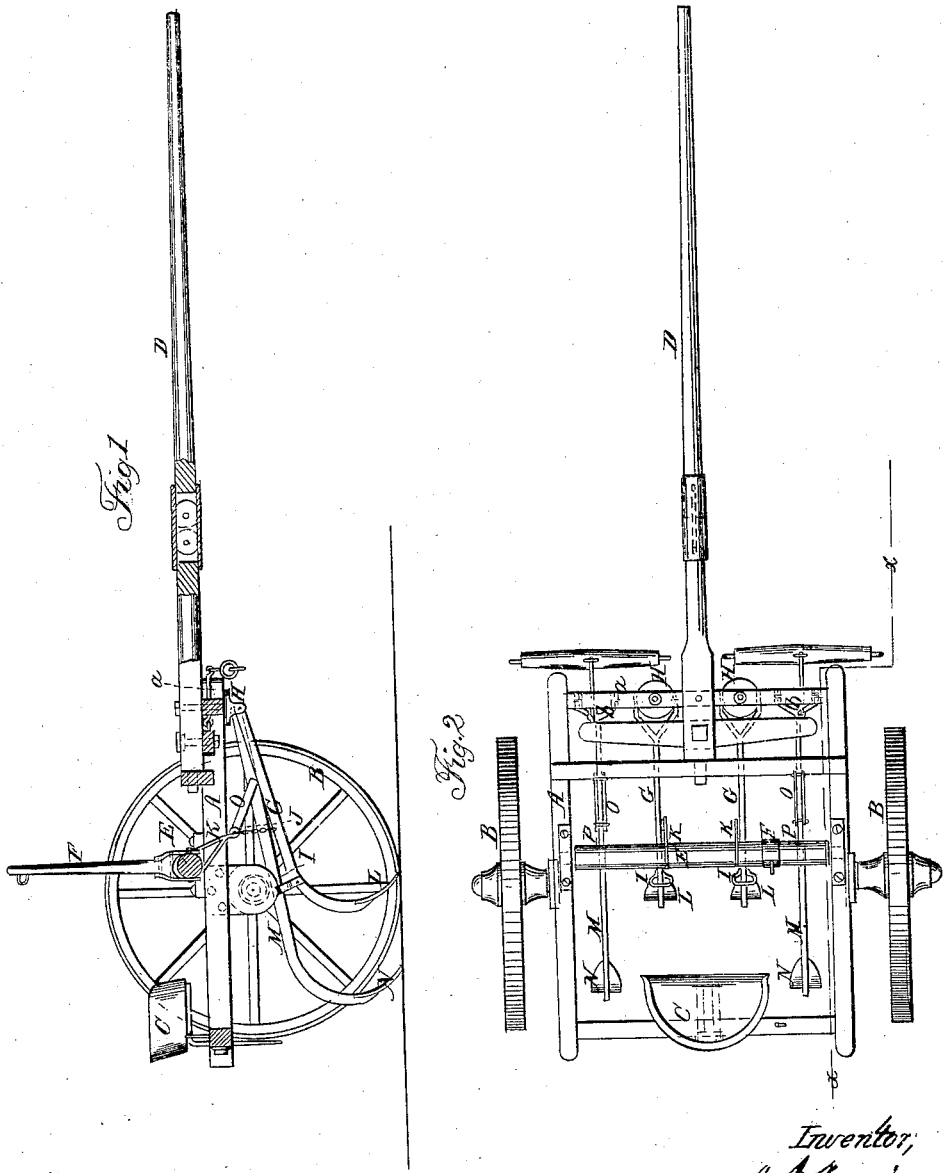

JOHN N. ARVIN, OF VALPARAISO, INDIANA.

IMPROVEMENT IN CULTIVATORS.

Specification forming part of Letters Patent No. 56,511, dated July 24, 1866.

*To all whom it may concern:*

Be it known that I, JOHN N. ARVIN, of Valparaiso, in the county of Porter and State of Indiana, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1 is a side sectional view of my invention taken in the line $x\ x$, Fig. 2; Fig. 2, a plan or top view of the same.

Similar letters of reference indicate corresponding parts.

This invention consists in a novel manner of arranging the inside shovels of the plow whereby said shovels may be adjusted laterally by the action of the feet of the driver so as to conform to the sinuosities of the rows of plants and all of the shovels be capable of being raised out of the ground when required.

The object of the invention is to obtain a simple and efficient cultivator—one which will be under the complete control of the operator and capable of being operated with the greatest facility.

A represents a rectangular frame which is mounted on two wheels, B B, and has the driver's seat C on its rear end and a draft-pole, D, secured to it at its front end in any proper manner.

E represents a shaft which is placed transversely on the frame A, and has a lever, F, attached for the convenience of turning it, said lever being within reach of the driver on his seat C.

G G represent two plow-beams, which may be constructed of metal, in curved form, as shown in Fig. 1, said beams being attached to the under side of the front cross-bar, *a*, of the frame A by means of universal joints H, to admit of said plow-beams being raised or lowered or moved laterally, as desired. These plow-beams have stirrups I attached to receive the feet of the driver, and each beam is connected by a chain, J, to arms K on the shaft E, so that by actuating the lever F to turn the shaft E the plow-beams G, and consequently the plows L, which are attached to them, may be raised when necessary or desired.

To the front cross-bar, *a*, of the frame A there are also attached two plow-beams, M M, similar to G G, but somewhat longer, and having plows N N secured to them. The plow-beams M M are attached to the cross-bar *a* by joints *b*, which will admit of their rising vertically, said beams being attached to the shaft E by links O, connected to arms P in the same way as the beams G G.

Hence it will be seen that all of the plows will be raised simultaneously by the turning of shaft E; but the plows of the beams G G are only allowed a lateral movement, as the latter plows work by the sides of the plants and require to be adjusted laterally to conform to the sinuosities of the rows, while the plows of the other beams simply pulverize the soil at the centers of the spaces between the rows of plants.

This cultivator is composed of but few parts, and it may be constructed economically or at a moderate cost.

Having thus described my invention, I claim as new and desire to secure by Letters Patent—

The arrangement of the joints *b*, universal joints H, links O, arms P, and chains J, in combination with the curved plow-beams G M and shaft E, operating in the manner and for the purpose herein specified.

JOHN N. ARVIN.

Witnesses:
 ISAAC CROSS,
 THOMAS JEWELL.